US012735601B2

(12) United States Patent
Nakamura et al.

(10) Patent No.: US 12,735,601 B2
(45) Date of Patent: Sep. 15, 2026

(54) PRINTING SHEET AND METHOD FOR PRODUCING PRINTING SHEET

(71) Applicant: TBM CO., LTD., Tokyo (JP)

(72) Inventors: Hiroshi Nakamura, Tokyo (JP); Koji Idei, Tokyo (JP)

(73) Assignee: TBM CO., LTD., Tokyo (JP)

( * ) Notice: Subject to any disclaimer, the term of this patent is extended or adjusted under 35 U.S.C. 154(b) by 0 days.

(21) Appl. No.: 18/294,299

(22) PCT Filed: May 18, 2022

(86) PCT No.: PCT/JP2022/020655

§ 371 (c)(1),
(2) Date: Feb. 1, 2024

(87) PCT Pub. No.: WO2023/017661

PCT Pub. Date: Feb. 16, 2023

(65) Prior Publication Data

US 2024/0343933 A1 Oct. 17, 2024

(30) Foreign Application Priority Data

Aug. 12, 2021 (JP) ................................ 2021-131658

(51) Int. Cl.

| | |
|---|---|
| ***C09D 133/08*** | (2006.01) |
| ***B41M 5/50*** | (2006.01) |
| ***B41M 5/52*** | (2006.01) |
| ***C08K 3/26*** | (2006.01) |
| ***C08K 3/34*** | (2006.01) |

(52) U.S. Cl.
CPC .......... *C09D 133/08* (2013.01); *B41M 5/508* (2013.01); *B41M 5/5218* (2013.01); *C08K 2003/265* (2013.01); *C08K 3/346* (2013.01)

(58) Field of Classification Search
CPC ..... B41M 5/508; B41M 5/5218; C08K 3/346; C08K 2003/265; C09D 133/08
See application file for complete search history.

(56) References Cited

U.S. PATENT DOCUMENTS

| | | | |
|---|---|---|---|
| 2003/0175501 A1 | 9/2003 | Concannon et al. | |
| 2007/0116943 A1 | 5/2007 | Sinclair et al. | |
| 2010/0215880 A1 | 8/2010 | Chu et al. | |
| 2014/0295173 A1 | 10/2014 | Kalihari et al. | |
| 2015/0353695 A1 | 12/2015 | Sumi | |
| 2021/0108373 A1 * | 4/2021 | Urasaki | D21H 19/54 |
| 2022/0266619 A1 | 8/2022 | Sato | |

FOREIGN PATENT DOCUMENTS

| | | | | |
|---|---|---|---|---|
| EP | 1090184 A1 | 4/2001 | | |
| EP | 1095784 A2 * | 5/2001 | ........... | B41M 5/506 |
| EP | 1633928 A2 | 3/2006 | | |
| EP | 3242970 A1 | 11/2017 | | |
| JP | H0720739 B2 | 3/1995 | | |
| JP | 2001225422 A | 8/2001 | | |
| JP | 2002513873 A | 5/2002 | | |
| JP | 2004533922 A | 11/2004 | | |
| JP | 2005520065 A | 7/2005 | | |
| JP | 2005248379 A | 9/2005 | | |
| JP | 2007520642 A | 7/2007 | | |
| JP | 2007524006 A | 8/2007 | | |
| JP | 4403131 B2 | 1/2010 | | |
| JP | 2012136794 A | 7/2012 | | |
| JP | 2014189941 A | 10/2014 | | |
| JP | 2015006793 A | 1/2015 | | |
| JP | 201748479 A | 3/2017 | | |
| JP | 2018508607 A | 3/2018 | | |
| JP | 201853402 A | 4/2018 | | |
| JP | 2020189417 A | 11/2020 | | |
| JP | 2021011080 A | 2/2021 | | |
| JP | 6894654 B1 | 6/2021 | | |
| WO | 2006051092 A1 | 5/2006 | | |
| WO | 2011114456 A1 | 6/2013 | | |
| WO | 2014109267 A1 | 7/2014 | | |

OTHER PUBLICATIONS

Machine Translation of JP 6894654B1 (Year: 2021).*
PCT International Search Report for International Application No. PCT/JP2022/020655, mailed Jun. 28, 2022, 7pp.
PCT Written Opinion for International Application No. PCT/JP2022/020655, mailed Jun. 28, 2022, 3pp.

* cited by examiner

*Primary Examiner* — Sathavaram I Reddy
(74) *Attorney, Agent, or Firm* — The Roy Gross Law Firm, LLC; Roy D. Gross

(57) ABSTRACT

An object of the present invention is to provide a printing sheet having a coated layer for ink receiving on at least one surface of a substrate, in which the printing sheet has excellent printability and excellent antistatic performance, being less likely to cause paper jams or other troubles during printing, and has excellent properties such as water resistance and weather resistance, and a method for producing the same. The printing sheet includes a coated layer made by blending clay in a ratio of 35% by mass to 65% by mass and heavy calcium carbonate in a ratio of 5% by mass to 30% by mass in a continuous phase made of an acrylic polymer on one surface or both surfaces of a substrate, in which a volume average particle diameter of the heavy calcium carbonate is 0.05 μm to 2.00 μm.

6 Claims, No Drawings

PRINTING SHEET AND METHOD FOR PRODUCING PRINTING SHEET

CROSS REFERENCE TO RELATED APPLICATIONS

This application is a National Phase of PCT Patent Application No. PCT/JP2022/020655 having International filing date of May 18, 2022, which claims the benefit of priority of Japanese Patent Application No. 2021-131658, filed Aug. 12, 2021, the contents of which are all incorporated herein by reference in their entirety.

FIELD

The present invention relates to a printing sheet and a method for producing a printing sheet. In detail, the present invention relates to a technology for improving adhesion and bonding of a coated layer to a substrate, printability, water resistance, weather resistance, antistatic properties, and other properties for a printing sheet having the coated layer on the surface of the substrate.

BACKGROUND

Conventionally, printing sheets using paper or plastic sheets made of polyester, polypropylene, or the like as substrates thereof have been known. In particular, for applications requiring properties including water resistance and tear strength such as posters and outdoor printed products, for example, synthetic paper obtained by adding inorganic fillers and a small amount of additives to plastic sheets or thermoplastic resins and molding the resultant material into sheets and the like has been mainly used.

In addition, now, environmental protection has become an international issue and thus the reduction in consumption of thermoplastic plastics and paper materials has been significantly studied. From such a viewpoint, inorganic substance powder-blended thermoplastic plastic compositions made by highly blending inorganic substance powders into thermoplastic plastics have been developed and put into practical use as the printing sheets as described above (refer to, for example, Patent Literature 1).

Meanwhile, in the case where the sheets made of such materials as described above are particularly considered to be used for printing applications, the surface of the plastic sheets is frequently modified in order to improve adhesion between inks and the plastic sheets on the printing surface and to improve coloring. Specifically, a coating liquid made of a clay latex and an acrylic polymer is coated to form a coated layer, which is also called an ink receiving layer or a print receiving layer (refer to, for example, Patent Literatures 2 to 4).

However, in the case where the clay latex is coated, for example, the whiteness of the printing sheet after coating is low because the component of clay has color, and thus the color as alternative paper has caused concern in some cases. In addition, the used latex includes a polystyrene component and thus a problem of yellowing over time also has arisen due to significant degradation by sunlight, in particular, ultraviolet rays.

On the other hand, as described in Patent Literature 2 and Patent Literature 3, in the case where conventional acrylic polymers are coated, a problem of easily generating static electricity has been arisen because the added hydrophilic acrylic polymer material for exhibiting an antistatic effect is highly depending on environments, in particular, in low humidity conditions such as winter, and thus the antistatic effect becomes low. Generation of static electricity causes problems of clogging during printing and blocking between sheets, which is not preferable. Furthermore, in the case where the acrylic polymers are coated onto olefinic plastic sheets such as polyethylene and polypropylene, polarity of the plastic sheets serving as substrates is low and thus the adhesive strength between the plastic sheets serving as the substrates and the coating liquids is weak depending on production conditions. Therefore, a problem of peeling off from the interface between the sheet and the coating also has arisen even when the coating is applied. In addition, when only the acrylic polymers have been used for coating, printability, in particular, toner fixability on laser beam printer (LBP) printing, has been poor and the toner has been required to be fixed under high temperature. This has caused a problem of frequent occurrence of troubles in which the sheets are melted due to heat and sheet jams (paper jams) occur in printing equipment.

Patent Literature 4 has disclosed that a mixture of at least two latexes of a latex of an acrylic polymer having an acid number of 20 mg to 60 mg KOH/g and a Tg of less than 35° C. and at least one latex of an acrylic polymer having a Tg of more than 90° C. is used as the acrylic polymer to improve suitability for high-speed printing at low temperatures, hollow polymer particles are blended in the coating liquid composition to improve thermal insulation properties of the coated layer, and silica particles having a primary particle diameter of less than 100 nm are blended in the coating liquid composition to improve the smoothness of the coated layer. However, in the case where these materials are blended into the coating liquid composition, a further decrease in the adhesive strength between the plastic sheet serving as the substrate and the coating liquid may be concerned, and no particular improvement can be expected in terms of the antistatic effect as described above.

Patent Literature 5 has disclosed that a predetermined amount of titania particles are blended together with clay, calcium carbonate, and the like into a polymer binder made of a vinyl acetate polymer, a vinyl-acrylic polymer, a styrene-acrylic polymer, or a styrene-butadiene-acrylic polymer using tetrapotassium pyrophosphate as a dispersing agent and the resultant mixture is applied to a substrate to give a sheet having high whiteness. Blending the predetermined amount of titania particles allows the whiteness to be surely improved. However, no particular improvement can be expected in the problems of adhesion between the substrate and the coated layer and poor water resistance and poor weather resistance of the coated layer as described above.

Furthermore, in Patent Literature 6, printing sheets having high smoothness obtained by coating the smooth substrate surface made of fibers having a weighed fiber length average of more than 0.9 mm with a composition made by blending pigments such as calcium carbonate precipitated aragonite, clay, and hollow spherical polyethylene pigments into an acrylic binder in a blended ratio of biner:pigment of 100:15 to 100:40 have been developed. However, in the case where such compositions are used, while the smoothness of the sheet can be expected to be improved, improvements in the whiteness and the printability of the sheet, the adhesion between the substrate and the coated layer, the antistatic properties, and the like cannot be expected.

In Patent Literature 7, as a coating composition applied by a DF coater method to a substrate in order to obtain a printing sheet, a coating composition including 5 parts by weight to 30 parts by weight of high aspect ratio clay and 70 parts by weight to 95 parts by weight of calcium carbonate containing 90% or more of particles smaller than 2 μm is described, whereby Patent Literature 7 has disclosed that a sheet having high whiteness can be economically obtained. Depending on the technology described in this Literature, while improvement in the whiteness of the sheet can be expected by highly blending calcium carbonate, change in the texture of the sheet (increasing feeling of glossiness of the printed product) is concerned due to highly blending calcium carbonate. In the Patent Literature 7, problems such as poor weather resistance and poor water resistance have arisen due to including the polystyrene component as described above because an SBR resin as a binder component of the paint composition is used.

Patent Literature 8 has disclosed printing sheets made by forming a composition made by blending hard polymer particles such as polymethyl methacrylate in a binder for film formation and a composition made by adding particles such as kaolin, calcinated clay, structured clay, heavy calcium carbonate, precipitated calcium carbonate, titanium dioxide, aluminum trihydride, satin white, silica, zinc oxide, and barium sulfate to the above composition as an ink receiving layer on the substrate. While improvement in the adhesion between the substrate and the coated layer and the water resistance is expected by blending polymethyl methacrylate particles, the matte appearance of the sheet may be increased due to blending the polymethyl methacrylate particles. In the case where the polymethyl methacrylate particles are mainly used as the particles blended in the receiving layer, for example, toner fixability is not sufficient and the toner is required to be fixed at high temperature when LBP printing is performed. Similarly, this may cause paper jams due to the sheet melting by heat. The polymethyl methacrylate particles are also disadvantageous from an economic viewpoint, leading to increasing sheet prices.

In preparing holograms, Patent Literature 9 has disclosed use of sheets made by forming a composition made by blending, for example, polymer pigments such as styrene-acrylic copolymer particles into acrylic polymers, styrene-acrylic copolymers, or the like on a substrate and further forming a composition made by blending precipitable calcium carbonate (PCC), heavy natural calcium carbonate, kaolin, or other clay to the above composition as the receiving layer on the substrate. However, similar to the technology in Patent Literature 8, in the case where polymer particles such as the styrene-acrylic copolymer particles are used, the matte appearance of the sheet may be increased. Furthermore, toner adhesion in LBP printing may be insufficient, or paper jams may occur inside the printer. The polymer particles are also disadvantageous from the economic viewpoint, leading to increasing sheet prices. In addition, moisture resistance has remained as a problem due to including the styrene component.

As ink-jet recording sheets, Patent Literature 10 has described a constitution made by providing an ink receiving layer including amorphous silica and a binder as main components on one surface of the substrate and providing a backing layer including pigments selected from the group consisting of delaminated clay, kaolin, talc, calcium carbonate, and a combination of delaminated clay and talc and styrene-acrylic copolymers, styrene-butadiene copolymers, or ethylene-vinyl acetate copolymers as the latex of a binder on the surface opposite to the surface where the ink receiving layer is provided. In this recording sheet, although the backing layer is formed by blending clay and calcium carbonate in the latex of the binder on the opposite side of the receiving layer, the backing layer is provided in order to improve the gluing processability of the sheet and the like. Therefore, the backing layer does not have a constitution for solving the problems in the receiving layer, which is one of the problems to be solved by the present invention, and includes the styrene component as the binder component and involves a moisture resistance problem.

Patent Literature 11 has disclosed a constitution made by forming a surface sizing layer made of oxidized starch, a sizing agent, and an acrylic polymer on the outer surface side of a paper liner forming the surface of a gypsum board, and further providing a coated layer made of at least one inorganic filler such as calcium carbonate, clay, aluminum silicate, calcined clay, titanium dioxide, and a mixture thereof and a binder such as a styrene-acrylic copolymer on the surface sizing layer. This Patent Literature has described that decorative patterns are printed on the coated layer. However, in the paper liner, a highly hydrophilic binder is used from reasons such as requirement for water permeability in forming the gypsum board. Therefore, even in the case where such a coated layer is applied to the printing sheet according to the present invention, the problems such as poor weather resistance and poor water resistance cannot be solved.

Patent Literature 12 has disclosed a coated film on which an ink-absorbing layer including at least three kinds of inorganic pigments, for example, light calcium carbonate, clay, and silica in a binder resin in a ratio of 2:1:2 to 2:3:2 is provided. In addition, Patent Literature 13 has disclosed a coating composition including precipitable calcium carbonate as a main body, clay, and a binder resin. However, printing sheets in which the coated layer includes large amount of other inorganic pigments, in particular, light calcium carbonate as compared to clay as described in these Patent Literatures cause difficulty to exhibit sufficient gloss and frequently result in poor printability.

The present applicant previously has studied the composition of the coated layer on one side or both sides of the substrate in order to solve the above problems. As a result, the inventors of the present invention have found that a printing sheet that solves troubles such as poor adhesion between the substrate and the coated layer, poor water resistance of the coated layer, yellowing due to poor weather resistance, and paper jamming in the printing process due to electrostatic charge and improves printability (fixability and transferability) to LBP and offset printability is obtained by blending clay and light calcium carbonate in the coated layer made of an acrylic polymer in a well-balanced predetermined ratio. This technology has already been filed as a patent and has disclosed in Patent Literature 14.

CITATION LIST

Patent Literature

Patent Literature 1: WO 2014/109267

Patent Literature 2: Japanese Examined Patent Application No. H7-20739

Patent Literature 3: Japanese Patent Application Laid-open No. 2015-6793

Patent Literature 4: WO 2006/051092

Patent Literature 5: Japanese Patent Application Laid-open No. 2014-189941

Patent Literature 6: Published Japanese Translation of PCT International Publication for Patent Application No. 2007-520642

Patent Literature 7: WO 2011/114456

Patent Literature 8: Published Japanese Translation of PCT International Publication for Patent Application No. 2005-520065

Patent Literature 9: Published Japanese Translation of PCT International Publication for Patent Application No. 2004-533922

Patent Literature 10: Japanese Patent No. 4403131

Patent Literature 11: Published Japanese Translation of PCT International Publication for Patent Application No. 2002-513873

Patent Literature 12: Japanese Patent Application Laid-open No. 2001-225422

Patent Literature 13: Published Japanese Translation of PCT International Publication for Patent Application No. 2018-508607

Patent Literature 14: Japanese Patent Application Laid-open No. 2021-011080

SUMMARY

Technical Problem

The printing sheet of Patent Literature 14 has excellent printability, excellent adhesion between the substrate and the coated layer, and excellent antistatic performance, is less likely to cause paper jams or other problems during printing, further has excellent properties such as water resistance and weather resistance, and exhibits excellent printability. In recent years, however, with the diversification of printing methods and the expansion of applications for sheets after printing, further improvement in various physical properties represented by adhesion and bonding between the substrate and the coated layer has been required.

The present invention has been made in view of the above circumstances and an object of the present invention is to provide a further improved printing sheet and a method for producing the same. In addition, an object of the present invention is to provide a printing sheet having a coated layer for ink receiving on at least one surface of the substrate, in which the printing sheet has excellent printability and excellent antistatic performance, being less likely to cause paper jams or other troubles during printing, and has excellent properties such as water resistance and weather resistance, in particular, the printing sheet has remarkably excellent adhesion and bonding between the substrate and the coated layer, and a method for producing the same.

Solution to Problem

The inventors of the present invention have studied again with respect to the blend of the coated layer made of an acrylic polymer and have found that the above problems are solved and, in particular, a printing sheet having excellent adhesion and bonding between the substrate and the coated layer is obtained by using heavy calcium carbonate having specific average particle diameter instead of light calcium carbonate and blending the heavy calcium carbonate in combination with talc in a predetermined amount.

In other words, the present invention for solving the above problems provides a printing sheet comprising a coated layer made by blending clay in a ratio of 35% by mass or more and 65% by mass or less and heavy calcium carbonate in a ratio of 5% by mass or more and 30% by mass or less in a continuous phase made of an acrylic polymer on one surface or both surfaces of a substrate, in which a volume average particle diameter of the heavy calcium carbonate is 0.05 μm or more and 2.00 μm or less.

An aspect of the printing sheet according to the present invention represents the printing sheet, in which the substrate is a substrate comprising a polyolefin-based resin and an inorganic substance powder in a ratio of 50:50 to 10:90 in a mass ratio.

An aspect of the printing sheet according to the present invention represents the printing sheet, in which the inorganic substance powder is a calcium carbonate powder.

An aspect of the printing sheet according to the present invention represents the printing sheet, in which a volume average particle diameter of the clay is 0.05 μm or more and 2.00 μm or less.

An aspect of the printing sheet according to the present invention represents the printing sheet, in which the acrylic polymer is a (meth)acrylic acid alkyl ester.

An aspect of the printing sheet according to the present invention represents the printing sheet, in which the (meth) acrylic acid alkyl ester is one or two or more compounds selected from the group consisting of methyl acrylate, ethyl acrylate, n-propyl acrylate, isopropyl acrylate, n-butyl acrylate, isobutyl acrylate, n-octyl acrylate, 2-ethylhexyl acrylate, isooctyl acrylate, nonyl acrylate, methyl methacrylate, ethyl methacrylate, n-propyl methacrylate, isopropyl methacrylate, n-butyl methacrylate, isobutyl methacrylate, n-octyl methacrylate, 2-ethylhexyl methacrylate, isooctyl methacrylate, 2-hydroxyethyl acrylate, 2-hydroxyethyl methacrylate, 2-hydroxypropyl acrylate, and 2-hydroxypropyl methacrylate.

An aspect of the printing sheet according to the present invention represents a printing sheet comprising a coated layer made by blending clay in a ratio of 35% by mass or more and 65% by mass or less and heavy calcium carbonate in a ratio of 5% by mass or more and 30% by mass or less in a continuous phase made of an acrylic polymer on one surface or both surfaces of a substrate (with proviso that a coated layer in which zinc pyrithione is blended in a ratio of 0.40% by mass or more and 2.00% by mass or less and/or zinc oxide having a volume average particle diameter of 0.05 μm or more and 2.00 μm or less is blended in a ratio of 0.10% by mass or more and 1.00% by mass or less in the continuous phase when the entire mass of the coated layer is determined to be 100%, is excluded), in which a volume average particle diameter of the heavy calcium carbonate is 0.05 μm or more and 2.00 μm or less.

An aspect of the printing sheet according to the present invention represents the printing sheet, in which the inorganic substance powder in the coated layer is substantially made only of the clay and the heavy calcium carbonate.

The present invention for solving the above problems provides a method for producing a printing sheet, the method comprising a step of applying an aqueous acrylic polymer emulsion made by blending clay in a ratio of 35% by mass or more and 65% by mass or less and heavy calcium carbonate having a volume average particle diameter of 0.05 μm or more and 2.00 μm or less in a ratio of 5% by mass or more and 30% by mass or less in a dry mass in a continuous phase made of an acrylic polymer to one surface or both surfaces of a substrate.

An aspect of the method for producing a printing sheet according to the present invention represents the method for producing a printing sheet, in which a substrate comprising a polyolefin resin and an inorganic substance powder in a ratio of 50:50 to 10:90 in a mass ratio is molded into a sheet by extrusion; and after subjecting the sheet to a stretching treatment step, the aqueous acrylic polymer emulsion is applied to one surface or both surfaces of the substrate sheet.

Advantageous Effects of Invention

According to the present invention, a printing sheet having a coated layer for ink receiving on at least one surface of the substrate can be provided, in which the printing sheet has excellent printability and excellent antistatic performance, being less likely to cause paper jams or other problems during printing, and has excellent properties such as water resistance and weather resistance. Furthermore, according to the present invention, the whiteness and texture (moderate feeling of glossiness) of the printing sheet are excellent and quick-drying of inks are excellent when the printing sheet is used for oil-based offset printing, UV offset printing, and the like, resulting in a printing sheet having excellent offset suitability. The printing sheet according to the present invention also has excellent adhesion and bonding between the substrate and the coated layer and thus the coated layer is less likely to cause troubles of peeling off during printing, subsequent bending and other processing, and during use. Therefore, the printing sheet can be subjected to various printing and processing processes and can be used not only for general-purpose printed products such as menu tables and posters, but also for various applications such as food products represented by milk cartons, medical and sanitary applications such as folding cups, and containers for storing medicinal liquids.

DESCRIPTION OF EMBODIMENTS

Hereinafter, the present invention will be described in detail with reference to an embodiment.

<<Printable Sheets>>

A printing sheet according to the present invention is a sheet provided with a sheet-shaped substrate and a coated layer formed on at least one surface of the substrate. This coated layer includes a composition made by blending clay in a ratio of 35% by mass or more and 65% by mass or less and heavy calcium carbonate having a volume average particle diameter of 0.05 μm or more and 2.00 μm or less in a ratio of 5% by mass or more and 30% by mass or less in a continuous phase made of an acrylic polymer.

In the printing sheet according to the present invention, other constitutions are not particularly limited as long as the sheet has a form having the above coated layer on at least one surface of the substrate. The printing sheet may be arbitrarily provided with an intermediate layer having a certain function, for example, a sealant layer for improving adhesion between the substrate and the coated layer, an internal printing layer for providing coloring and patterns to the printing sheet, and a shielding layer between the substrate and the coated layer; a protection layer, an adhesion layer, and other layers on the surface of the substrate where the coated layer is not provided; or further a protection layer and other layers on the surface of the coated layer.

(1) Substrate

The material of the substrate in the printing sheet according to the present invention is not particularly limited and may be constituted of plastic sheets made of resin-based materials as the main components, may be constituted of paper-based materials, or may be constituted of synthetic paper. Furthermore, as the substrate, use of a sheet made of an inorganic substance powder-blended thermoplastic plastic made by highly blending an inorganic substance powder into a thermoplastic plastic, in particular, a sheet made of the inorganic substance powder-blended thermoplastic plastic including a polyolefin-based resin and the inorganic substance powder in a mass ratio of 50:50 to 10:90 is preferable from the viewpoint of environmental preservation and improvement in properties such as mechanical strength and heat resistance.

(Resin Component)

The resins constituting the plastic sheet or the inorganic substance powder-blended thermoplastic plastic sheet are not particularly limited and various types of the resins may be used depending on the application, function, and the like of the printing sheet. Examples of the resin include polyolefin-based resins such as polyethylene-based resins, polypropylene-based resins, poly(methyl-1-pentene), and ethylene-cyclic olefin copolymers; functional group-containing polyolefin resins such as ethylene-vinyl acetate copolymers, ethylene-acrylic acid copolymers, ethylene-methacrylic acid copolymers, metal salts of ethylene-methacrylic acid copolymers (ionomers), ethylene-acrylic acid alkyl ester copolymers, ethylene-methacrylic acid alkyl ester copolymers, maleic acid-modified polyethylene, and maleic acid-modified polypropylene; polyamide-based resins such as nylon-6, nylon-6,6, nylon-6,10, and nylon-6,12; thermoplastic polyester resins such as aromatic polyester-based resins including polyethylene terephthalate and copolymers thereof, polyethylene naphthalate, and polybutylene terephthalate, and aliphatic polyester-based resins including polybutylene succinate and polylactic acid; polycarbonate resins such as aromatic polycarbonates and aliphatic polycarbonates; polystyrene-based resins such as atactic polystyrene, syndiotactic polystyrene, acrylonitrile-styrene (AS) copolymers, and acrylonitrile-butadiene-styrene (ABS) copolymers; polyvinyl chloride-based resins such as polyvinyl chloride and polyvinylidene chloride; polyphenylene sulfide; and polyether-based resins such as polyethersulphone, polyetherketone, and polyetheretherketone. These resins may be used singly or in combination of two or more of these resins.

Of these thermoplastic resins, the polyolefin-based resins, the aromatic polyester-based resins, and the aliphatic polyester-based resins are preferably used from the viewpoint of ease of molding, performance aspects, economic aspects, and the like of the thermoplastic resins.

Here, the polyolefin-based resins refer to polyolefin-based resins in which an olefin component unit serves as a main component. Specific examples of the polyolefin-based resins include the polypropylene-based resins and the polyethylene-based resins as described above, in addition, polymethyl-1-pentene and ethylene-cyclic olefin copolymers, as well as mixtures of two or more of these resins. The term "serves as a main component" means that 50% by mass or more of the olefin component unit is contained in the polyolefin-based resin. The content is preferably 75% by mass or more, more preferably 85% by mass or more, and further preferably 90% by mass or more. The method for producing the polyolefin-based resin used in the present invention is not particularly limited. The polyolefin-based resin may be obtained by any of the methods using a Ziegler-Natta catalyst, a metallocene catalyst, oxygen, a radical initiator such as peroxide, and the like.

Examples of the polypropylene-based resin include resins including a propylene component unit of 50% by mass or more. Examples of the resin include propylene homopolymers or copolymers of propylene and other α-olefins copolymerizable with propylene. Examples of the other α-olefins that can be copolymerized with propylene include α-olefins having a carbon number of 4 to 10 such as ethylene, 1-butene, isobutylene, 1-pentene, 3-methyl-1-butene, 1-hexene, 3,4-dimethyl-1-butene, 1-heptene, and 3-methyl-1-hexene. As the propylene homopolymers, any of isotactic polypropylene, syndiotactic polypropylene, atactic polypropylene, hemiisotactic polypropylene, and linear or branched polypropylene exhibiting various stereoregularities are included. The copolymer may be a random copolymer or a block copolymer and may be not only a binary copolymer but also a ternary copolymer. Specific examples thereof include an ethylene-propylene random copolymer, a butene-1-propylene random copolymer, an ethylene-butene-1-propylene random ternary copolymer, and an ethylene-propylene block copolymer.

Examples of the polyethylene-based resin include resins having an ethylene component unit of 50% by mass or more. Examples of the polyethylene-based resin include high-density polyethylene (HDPE), low-density polyethylene (LDPE), medium-density polyethylene, linear low-density polyethylene (LLDPE), an ethylene-vinyl acetate copolymer, an ethylene-propylene copolymer, an ethylene-propylene-butene-1 copolymer, an ethylene-butene-1 copolymer, an ethylene-hexene-1 copolymer, an ethylene-4-methylpentene-1 copolymer, an ethylene-octene-1 copolymer, and a mixture of two or more of these resins.

Of the polyolefin-based resins described above, the polypropylene-based resin is preferably used because the polypropylene-based resin has particularly excellent balance between mechanical strength and heat resistance.

(Inorganic Substance Powder)

As described above, the inorganic substance powder that may be blended in the sheet in the case where the substrate is the inorganic substance powder-blended thermoplastic plastic sheet is not particularly limited. Examples thereof include powdery carbonates, sulfates, silicates, phosphates, borates, oxides, or hydrates of calcium, magnesium, aluminum, titanium, iron, zinc, and the like. Specifically, calcium carbonate, magnesium carbonate, zinc oxide, titanium oxide, silica, alumina, clay, talc, kaolin, aluminum hydroxide, magnesium hydroxide, aluminum silicate, magnesium silicate, calcium silicate, aluminum sulfate, magnesium sulfate, calcium sulfate, magnesium phosphate, barium sulfate, silica sand, carbon black, zeolite, molybdenum, diatomaceous earth, sericite, shirasu, calcium sulfite, sodium sulfate, potassium titanate, bentonite, and graphite are exemplified. These inorganic substance powders may be synthetic products or products originated from natural minerals and may be used singly or in combination of two or more of these inorganic substance powders.

In addition, the shape of the inorganic substance powder is not particularly limited and may be in the form of any of particles, flakes, granules, fibers, and the like. The particle shape may be a spherical shape as is generally obtained by synthetic methods, or an irregular shape as is obtained by grinding natural minerals.

Preferable examples of these inorganic substance powders include calcium carbonate, magnesium carbonate, zinc oxide, titanium oxide, silica, alumina, clay, talc, kaolin, aluminum hydroxide, and magnesium hydroxide. Calcium carbonate powder is particularly preferable. As calcium carbonate, both of what is called light calcium carbonate prepared by a synthesis method and what is called heavy calcium carbonate obtained by mechanically grinding and classifying natural raw materials including $CaCO_3$ as the main component such as limestone may be used and the combination thereof may also be used. From the economic viewpoint, heavy calcium carbonate is preferable.

Here, heavy calcium carbonate is a product obtained by mechanically grinding and processing natural limestone or the like and is clearly distinguished from synthetic calcium carbonate produced by chemical precipitate reaction or the like. The grinding method includes a dry method and a wet method. From the viewpoint of economic efficiency, the dry method is preferable.

In order to improve the dispersibility or reactivity of the inorganic substance powder, the surface of the inorganic substance powder may be previously modified in accordance with a common method. Examples of the surface modification method include physical methods such as plasma treatment and a method in which the surface is subjected to chemical surface treatment with a coupling agent or a surfactant. Examples of the coupling agent include a silane coupling agent and a titanium coupling agent. As the surfactant, any of an anionic surfactant, a cationic surfactant, a nonionic surfactant, and an amphoteric surfactant may be used. Examples of the surfactant include higher fatty acids, higher fatty acid esters, higher fatty acid amides, and higher fatty acid salts.

The inorganic substance powder is preferably particles. The average particle diameter of the inorganic substance powder is preferably 0.1 μm or more and 50.0 μm or less, more preferably 1.0 μm or more and 10.0 μm or less, and further preferably 1.0 μm or more and 5.0 μm or less. The average particle diameter of the inorganic substance powder described in the present specification refers to a value calculated from the measurement result of the specific surface area by the air permeation method in accordance with JIS M-8511. As a measurement apparatus, for example, a specific surface area measurement apparatus Type SS-100 manufactured by SHIMADZU CORPORATION may be preferably used. In particular, in the particle diameter distribution of the inorganic substance powder, particles having a particle diameter of more than 50.0 μm are preferably excluded. On the other hand, excessively fine particles cause the viscosity at the time of kneading with the thermoplastic resin described above to significantly increase and thus production of the molded products may be difficult. Therefore, the average particle diameter of the inorganic substance powder is preferably set to 0.5 μm or more.

Inorganic substance powders may be a fiber-like, powder-like, flake-like, or granule-like shape.

The average fiber length of the inorganic substance powder having a fiber-like shape is preferably 3.0 μm or more and 20.0 μm or less. The average fiber diameter is preferably 0.2 μm or more and 1.5 μm or less. The aspect ratio is usually 10 or more and 30 or less. The average fiber length and average fiber diameter of the inorganic substance powder having the fiber-like shape are measured by an electron microscope and the aspect ratio is a ratio of the average fiber length relative to the average fiber diameter (Average fiber length/Average fiber diameter).

In the case where the substrate is the inorganic substance powder-blended thermoplastic plastic sheet as described above, the blend ratio (% by mass) of the thermoplastic resin and the inorganic substance powder included in the inorganic substance powder-blended thermoplastic plastic sheet is desirably in a ratio of 50:50 to 10:90, more preferably in a ratio of 40:60 to 20:80, and further preferably in a ratio of 40:60 to 25:75. This is because, in the blend ratio of the thermoplastic resin and the inorganic substance powder, a ratio of the inorganic substance powder of less than 50% by mass causes the specified texture and physical properties such as impact resistance of an inorganic powder-blended thermoplastic resin composition due to blend of the inorganic substance powder not to be obtained, whereas a ratio of the inorganic substance powder of more than 90% by mass causes molding processing by, for example, extrusion molding and vacuum molding to be difficult.

(Other Additives)

In the case where the substrate is the plastic sheet or the inorganic substance powder-blended thermoplastic plastic sheet, other additives can be blended in the composition as auxiliary agents, if necessary. Examples of the other additives include plasticizers, colorants, lubricants, coupling agents, fluidity improvers, dispersing agents, antioxidants, ultraviolet ray absorbers, flame retardants, stabilizers, antistatic agents, and foaming agents. These additives may be used singly or in combination of two or more of these additives.

(Paper-Based Material)

Specific examples in the cases where the substrate is constituted of paper-based materials include paper substrates such as glassine paper, coated paper, fine paper, dust-free paper, and impregnated paper, and laminated paper in which a thermoplastic resin such as polyethylene is laminated to the above paper substrates.

(Substrate Composition)

The substrate may be constituted of a single layer sheet constituted of the materials described above or may be constituted by laminating a plurality of layers. In the case where the substrate is the plastic sheet or the inorganic substance powder-blended thermoplastic plastic sheet, the sheet may be unstretched or stretched in a uniaxial or biaxial direction such as a longitudinal or transverse direction.

The thickness of the substrate is not particularly limited and is usually 10 μm or more and 300 μm or less and preferably 25 μm or more and 200 μm or less.

In the case where the substrate made of the plastic sheet or the inorganic substance powder-blended thermoplastic plastic sheet is used, surface treatment such as oxidation methods and methods for forming surface unevenness can be applied to one surface or both surfaces in order to improve adhesion to the coated layer provided on the surface of the substrate. The oxidation methods include corona discharge treatment, flame treatment, plasma treatment, glow discharge treatment, chromic acid treatment (wet method), flame treatment, hot air treatment, and ozone and ultraviolet irradiation treatment. The methods for forming surface unevenness include sandblasting methods and solvent treatment methods. Primer treatment may also be applied.

(2) Coated Layer

The coated layer that the printing sheet according to the present invention has may be provided on only one surface of the substrate or may be provided on both surfaces of the substrate. The thickness of this coated layer is not particularly limited. For example, the thickness is preferably 1 μm or more and 10 μm or less, more preferably 2 μm or more and 8 μm or less, and particularly preferably 3 μm or more and 5 μm or less. The thickness within this range allows the coated layer to sufficiently function as the ink receiving layer, the ink receiving properties such as excellent colorability and color development to be exhibited, and properties of the printing sheet such as the water resistance, the antistatic properties of the surface, and the adhesion to inks to be excellent.

Thus, in the present invention, this coated layer is made by adding clay in a ratio of 35% by mass or more and 65% by mass or less, more preferably 38% by mass or more and 60% by mass or less, and further preferably 40% by mass or more and 55% by mass or less, and heavy calcium carbonate having a volume average particle diameter of 0.05 μm or more and 2.00 μm less in a ratio of 5% by mass or more and 30% by mass or less, more preferably 7% by mass or more and 27% by mass or less, and further preferably 9% by mass or more and 25% by mass or less in a continuous phase made of an acrylic polymer serving as a matrix.

In the coated layer, the presence of the clay and the heavy calcium carbonate having a predetermined particle diameter in the continuous phase made of the acrylic polymer in the predetermined amounts described above in a well-balanced manner allows the desired water resistance and whiteness of the printing sheet to be maintained, and at the same time, a fine unevenness to be formed without losing sheet surface smoothness, resulting in obtaining the effect of improvement in weather resistance due to scattering of incident light. The presence of the clay in the continuous phase made of the acrylic polymer allows a resistivity, in particular, a surface resistivity to be lowered and toner to be transferred without applying high voltage, for example, when LBP printing is performed. Furthermore, the presence of the heavy calcium carbonate in the continuous phase made of the acrylic polymer allows yellowish coloration caused by the clay to be alleviated, the whiteness to be maintained, oil resistance to be improved, quick-drying of inks to be improved, and oil-based offset printability to be improved. In the printing sheet according to the present invention, blending the heavy calcium carbonate having the predetermined particle diameter as described above in combination with the clay in the coated layer in a well-balanced manner also allows extremely excellent adhesion and bonding between the substrate and the coated layer to be provided.

The present invention is not limited by any specific theory. The reason for achieving the effects of the present invention can be attributed to development of the anchor effect caused by the heavy calcium carbonate having the predetermined particle diameter as described above. As described above, heavy calcium carbonate is obtained by mechanically crushing and processing natural limestone and other materials and thus generally has particles of more irregular shape having a lot of unevenness than those of light calcium carbonate having a similar particle diameter. Blending the heavy calcium carbonate having the specific volume average particle diameter among such heavy calcium carbonate together with the clay allows physical unevenness to be formed on the surface of the coated layer and adhesion to be possibly improved by the anchor effect at the bonding interface with the substrate.

It is conceivable that the presence of the clay (and the heavy calcium carbonate) on the surface of the coated layer allows fine unevenness on the sheet surface to be formed and thus the weather resistance improvement effect caused by scattering incident light to be obtained, the presence of the heavy calcium carbonate in addition to the clay on the surface of the coated layer allows sufficient water resistance to be maintained, and the presence of the clay further allows an excellent antistatic effect to be provided. Furthermore, it is presumed that blending the clay and the heavy calcium carbonate in the coated layer in the predetermined ratio in a well-balanced manner allows the printability (fixability and transferability) to LBP of the obtained printing sheet and offset printability to be improved.

As described in Comparative Examples later and in Patent Literature 14, use of heavy calcium carbonate having a volume average particle diameter of more than 2.00 μm results in rather lowering the adhesion between the substrate and the coated layer as compared to the adhesion when the same amount of light calcium carbonate is used. This is also the reason why light calcium carbonate has been selected together with talc in the invention of Patent Literature 14. However, when the study is conducted again this time, it has been found that the use of the heavy calcium carbonate having a volume average particle diameter of 0.05 μm or more and 2.00 μm or less allows higher adhesion to be exhibited than the adhesion when light calcium carbonate having a similar particle diameter is used. While heavy calcium carbonate having a large particle diameter of more than 2.00 μm in volume average particle diameter causes the effect caused by the unevenness of the particle surface to be difficult to exhibit and rather lowering in adhesion caused by dropout of the particles and other factors to occur, the heavy calcium carbonate having the above volume average particle diameter may exhibit unexpected effect at this time because the particle dropout does not occur and the effect of irregular shape is significantly exhibited due to the small size of the particles.

An amount of the blended clay in the coated layer of less than the above range may cause reduction in the surface resistivity of the sheet due to blending the clay to be insufficient and the resistivity to increase. This may cause, for example, the adhesive strength of the toner to be reduced and transferability also to be reduced in the case where the printing sheet is used for LBP printing. In addition, adhesion to the substrate may also be reduced. On the other hand, an amount of the blended clay of more than the above range may cause the water resistance of the coated layer to deteriorate, adverse effect on its appearance to be generated, and the coated layer not to be formed as the continuous layer having sufficient strength, while transferability in the case where the printing sheet is used for LBP printing is excellent.

Setting the amount of the heavy calcium carbonate within the above range allows the whiteness of the sheet to be maintained at a desired level. In other words, the coated layer of the printing sheet according to the present invention includes the clay in a ratio of 30% by mass or more as described above, and thus the color difference of yellow (b' value) of the sheet may increase. However, blending the heavy calcium carbonate in a ratio of 5% by mass or more as described above allows the whiteness to be effectively improved. Furthermore, setting the amount of the heavy calcium carbonate within the above range allows moderate oil resistance to be exhibited, quick-drying of oil-based inks to be improved, and oil-resistant offset suitability to be improved. In addition, blending the heavy calcium carbonate in a ratio of 30% by mass or less allows the surface of the coated layer to be smooth and a degree of gloss to increase. A blend ratio of more than 30% by mass causes the degree of gloss to decrease. In terms of increasing the degree of gloss in particular, the blend ratio is preferably in a ratio of 25% by mass or less and further preferably in a ratio of 20% by mass or less.

The coated layer included in the printing sheet according to the present invention is formed by blending the clay and the heavy calcium carbonate in a predetermined ratio as described above. Therefore, appropriately adjusting the amounts and particle diameters of the blended clay and heavy calcium carbonate and the thickness of the formed coated layer within the predetermined ranges also allows the surface of the coated layer to be a matte state having a certain degree of roughness or to be a glossy state having a high degree of gloss.

Hereinafter, each component forming the coated layer according to the present invention will be described in detail.

(Acrylic Polymer Forming Continuous Phase)

Acrylic polymers serving as the matrix of the coated layer include polymerized products obtained using (meth)acrylic acid, (meth)acrylic esters, (meth)acrylamides, and (meth) acrylonitrile as the main monomer components. The term "(meth)acrylic" used in the present specification is used in a sense that includes both "acrylic" and "methacrylic".

More specifically, the monomer components constituting the acrylic polymer are not particularly limited and examples thereof include one or two or more of the components selected from the group consisting of the following components:

Acrylic acid and methacrylic acid;

for example, acrylic acid alkyl esters in which the alkyl group has a carbon number of 1 to 18 such as methyl acrylate, ethyl acrylate, n-propyl acrylate, isopropyl acrylate, n-butyl acrylate, isobutyl acrylate, t-butyl acrylate, hexyl acrylate, n-octyl acrylate, 2-ethylhexyl acrylate, isooctyl acrylate, nonyl acrylate, lauryl acrylate, stearyl acrylate, palmityl acrylate, and cyclohexyl acrylate;

for example, methacrylic acid alkyl esters in which the alkyl group has a carbon number of 1 to 18 such as methyl methacrylate, ethyl methacrylate, n-propyl methacrylate, isopropyl methacrylate, n-butyl methacrylate, isobutyl methacrylate, t-butyl methacrylate, hexyl methacrylate, n-octyl methacrylate, 2-ethylhexyl methacrylate, isooctyl methacrylate, nonyl methacrylate, lauryl methacrylate, stearyl methacrylate, palmityl methacrylate, and cyclohexyl methacrylate;

for example, alkyl esters having a hydroxyl group on the side chain of (meth)acrylic acid such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, and monohydroxyethyl phthalate acrylate;

for example, polyethylene glycol diacrylate having ethylene glycol units in the molecule (n is desirably 3 or more and 20 or less), trimethylolpropane EO modified triacrylate (n is desirably 3 or more and 20 or less), and phenol EO modified acrylate (n is desirably 3 or more and 20 or less), for example, alkenyloxyalkyl esters of (meth)acrylic acid such as allyloxyethyl acrylate and allyloxyethyl methacrylate, and for example, alkyl esters having an alkoxyl group on the side chain of (meth)acrylic acid, such as methoxybutyl acrylate, methoxybutyl methacrylate, methoxyethyl acrylate, methoxyethyl methacrylate, ethoxybutyl acrylate, and ethoxybutyl methacrylate;

for example, alkenyl esters of (meth)acrylic acid such as allyl acrylate and allyl methacrylate;

for example, alkyl esters having an epoxy group on the side chain of (meth)acrylic acid such as glycidyl acrylate, glycidyl methacrylate, methylglycidyl acrylate, and methylglycidyl methacrylate;

for example, mono- or di-alkylaminoalkyl esters of (meth)acrylic acid such as diethylaminoethyl acrylate, diethylaminoethyl methacrylate, methylaminoethyl acrylate, and methylaminoethyl methacrylate;

for example, silicone-modified (meth)acrylic esters having a silyl group, an alkoxysilyl group, or a hydrolyzable alkoxysilyl group as a side chain;

for example, acrylamide and methacrylamide;

for example, (meth)acrylamides having a methylol group such as N-methylolacrylamide and N-methylolmethacrylamide; for example, (meth)acrylamide having an alkoxymethylol group such as N-alkoxymethylolacrylamides (for example, N-isobutoxymethylolacrylamide) and N-alkoxymethylolmethacrylamides (for example, N-isobutoxymethylolmethacrylamide);

for example, (meth)acrylamide having an alkoxyalkyl group such as N-butoxymethylacrylamide and N-butoxymethylmethacrylamide; and various acrylic monomers such as acrylonitrile and methacrylonitrile can be included as the monomer components constituting the acryl resins.

Furthermore, in the case where coating film strength of the coated layer is tried to be enhanced by introducing a crosslinking structure by photo-curing reaction or other method to the acrylic polymer, bi-functional to multi-functional acrylic monomers, specifically, multi-functional (meth)acrylates such as 1,4-butanediol di(meth)acrylate, 1,6-hexanediol di(meth)acrylate, neopentyl glycol di(meth) acrylate, the above polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphate di(meth)acrylate, allylated cyclohexyl di(meth) acrylate, isocyanurate di(meth)acrylate, trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, pentaerythritol tetra(meth)acrylate, dipentaerythritol penta(meth)acrylate, propionic acid-modified dipentaerythritol penta(meth)acrylate, dipentaerythritol hexa(meth)acrylate, and caprolactone-modified dipentaerythritol hexa(meth)acrylate may also be blended.

These monomer components can be used singly or in combination by mixing these monomers.

In other words, the acrylic polymer constituting the continuous phase of the coated layer in the present invention may be a homopolymer made only of any one of the various monomer components exemplified above or a copolymer made by combining the monomer components exemplified above.

Furthermore, in one embodiment of the present invention, copolymers containing other monomer components in addition to the above monomer components can be used as the acrylic polymer.

Monomer components not exemplified above are not particularly limited as long as the monomer components form copolymers with the above monomer components. Examples of such monomer components include vinyl monomers such as vinyl acetate, vinyl chloride, vinylidene chloride, vinyl lactate, vinyl butyrate, vinyl versatate, and vinyl benzoate, ethylene, butadiene, and styrene. However, preferably, no styrene is desirably contained from the viewpoint of weather resistance of the obtained sheet.

A method for forming a coated layer on the printing sheet according to the present invention is not particularly limited. Generally, the coating liquid is desirably used in the form of being dispersed in water or being dissolved in an organic solvent from the viewpoint of coatability in forming such a coat layer. In particular, the coating liquid is desirably in the form of being dispersed in water, that is, in the form of the aqueous acrylic polymer emulsion. Therefore, the acrylic polymer is preferably in the form of the aqueous emulsion at the stage at which the acrylic polymer serves as a raw material to form the coated layer.

Emulsion polymerization itself in producing the aqueous acrylic polymer emulsion has been known to those skilled in the art. The surfactants used in the emulsion polymerization may be anionic, cationic, amphoteric, or nonionic surfactants, and can be used singly or in combination of two or more of these surfactants. Of these surfactants, nonionic and cationic surfactants are preferable. The nonionic surfactants are not particularly limited. Examples include polyoxyethylene alkyl ethers, polyoxyethylene alkylphenyl ethers, polyoxyethylene alkyl esters, sorbitan alkyl esters, and polyoxyethylene sorbitan alkyl esters. The cationic surfactants are not particularly limited. Examples include dodecyltrimethylammonium chloride, stearyltrimethylammonium chloride, and N-2-ethylhexylpyridinium chloride. The most preferable surfactants are nonionic surfactants. Of the nonionic surfactants, the polyoxyethylene alkylphenyl ethers are particularly preferable. The amount of the surfactant is not particularly limited. Usually, an amount of 13 by mass to 5% by mass relative to the total amount of the monomers is preferably used.

Furthermore, water-soluble polymers such as gelatin and polyvinyl alcohol may be used together as protective colloidal agents.

As radical polymerization initiators in the emulsion polymerization, water-soluble type initiators such as persulfates including potassium persulfate and ammonium persulfate, hydrogen peroxide, t-butyl hydroperoxide, and a hydrochloride salt of azobisamidinopropane and oil-soluble type initiators such as benzoyl peroxide, diisopropyl peroxydicarbonate, cumyl peroxyneodecanoate, cumyl peroxyoctoate, and azobisisobutyronitrile are exemplified. The water-soluble type initiators are preferable. The polymerization initiators are not particularly limited and are used, for example, in a ratio of 0.01% by mass to 0.50% by mass of the total amount of the monomers.

The polymerization reaction is not particularly limited. Usually, the reaction is performed at temperature of 35° C. to 90° C. while stirring. The reaction time is usually 3 hours to 40 hours. Adjusting the pH by adding a basic substance at the beginning or at the end of emulsion polymerization allows storage stability, freezing stability, chemical stability, and the like of the emulsion to be improved. In this case, the obtained emulsion is preferably adjusted so as to be a pH of 5 to 9. In order to achieve this, basic substances such as ammonia, ethylamine, diethylamine, triethylamine, ethanolamine, triethanolamine, dimethylethanolamine, caustic soda, and caustic potash can be used.

Although not limited, (meth)acrylic acid alkyl esters are preferably exemplified as the acrylic polymer serving as the matrix of the coated layer.

(Clay)

Furthermore, in the present invention, the continuous phase of the acrylic polymer serving as the matrix is blended with the clay in a predetermined ratio in combination with the heavy calcium carbonate described later.

The clay used in the present invention is not particularly limited and any known clay can be appropriately used. The term "clay" as used in the present specification includes clay minerals with a layered structure as well as clay minerals without a layered structure such as imogolite and allophene. The clay minerals having the layered structure include swelling minerals such as smectite, vermiculite, montmorillonite, bentonite, illite, hectorite, halloysite, saponite, bidelite, stevensite, nontronite, mica, brittle mica, sericite, glauconite, and hydrotalcite; and non-swelling minerals such as kaolin minerals (kaolinite), serpentine, pyrophyllite, talc, chlorite, and zeolite. Examples of such clay include natural clay, synthetic clay, and organoclay.

The organoclay is not particularly limited, can include any known organoclay, and is preferably formed by performing organification of clay using an organification agent. The clay before performing such organification is not particularly limited, may be what is called clay minerals, and may be any of the clay minerals exemplified above. Such clay may be natural products or synthetic products.

The organification agent is not particularly limited and any known organification agent that can produce organoclay can be appropriately used. For example, hexylammonium ion, octylammonium ion, 2-ethylhexylammonium ion, dodecylammonium ion, laurylammonium ion, octadecylammonium ion, dioctyldimethylammonium ion, trioctylammonium ion, dioctadecyldimethylammonium ion, and trioctadecylammonium ion can be used.

The clay used in the present invention is not particularly limited. Kaolin clay is particularly preferable from the viewpoint of uniform dispersion in the coated layer.

The particle diameter of the clay is not particularly limited and depends on, to some extent, the thickness of the coated layer to be formed. For example, the volume average particle diameter is preferably 0.05 μm or more and 2.00 μm or less, more preferably 0.1 μm or more and 1.7 μm or less, particularly preferably 0.2 μm or more and 1.5 μm or less, and further preferably 1.0 μm or less. The clay having such a particle diameter range allows the clay to be blended with excellent dispersibility in the coated layer to be formed and the intended effects such as improvement in substrate adhesion, improvement in printability, and antistatic performance described above to be more suitably exhibited.

The shape of the clay is not particularly limited. The shape may be any of spherical, ellipsoidal, flattened, or irregular shapes and is preferably close to the spherical shape from the viewpoint of uniform dispersion in the coated layer. From this viewpoint, the aspect ratio of the clay is preferably 5 or less, more preferably 3 or less, and further preferably 2 or less. The above aspect ratio refers to Major axis/Minor axis.

With respect to the clay, uniform particle size between particles is desirable from the viewpoint of uniform in-plane properties of the coated layer.

Furthermore, the specific gravity of the clay is not particularly limited. For example, the specific gravity is 1.5 to 3.0 and more preferably 2.0 to 2.8, desirably from the viewpoint of uniform dispersion throughout the entire coated layer to be formed.

(Heavy Calcium Carbonate)

In the present invention, the coated layer includes the heavy calcium carbonate having a predetermined particle diameter together with the clay. The term "heavy calcium carbonate" refers to calcium carbonate produced by mechanically grinding and classifying natural raw materials including $CaCO_3$ such as limestone as a main component and is clearly distinguished from light calcium carbonate (synthetic calcium carbonate) produced by chemical precipitate reaction and the like.

The heavy calcium carbonate used in the present invention has a volume average particle diameter of 0.05 μm or more and 2.00 μm or less as described above. The volume average particle diameter is, for example, preferably 0.07 μm or more and 1.50 μm or less, more preferably 0.10 μm or more and 1.00 μm or less, and particularly preferably 0.20 μm or more and 0.50 μm or less. The heavy calcium carbonate having a particle diameter within this range allows the whiteness desired for the printing sheet to be improved and the smoothness of the coated layer and the glossiness of the sheet to be also improved.

(Other Additives)

In the present invention, the coated layer may include other components in addition to the additives described above.

Specific examples of the additives include cross-linking agents, pH adjusters, thickeners, flow modifiers, defoamers, antifoamers, surfactants, mold release agents, penetrating agents, coloring pigments, coloring dyes, fluorescent whitening agents, ultraviolet ray absorbers, antioxidants, antiseptic agents, mold inhibitors, antimicrobial agents such as zinc pyrithione, water proofing agents, ink fixing agents, curing agents, and weather resistant materials. The blended amount of each of these additives represented by the antimicrobial agent is, for example, less than 0.40% by mass, further preferably 0.30% or less, and particularly preferably 0.20% or less in the case where the entire mass of the coated layer is determined to be 100% by mass. In some aspects, no antimicrobial agents such as zinc pyrithione may be included in the coated layer.

Examples of the cross-linking agents include aldehyde-based compounds, melamine-based compounds, isocyanate-based compounds, zirconium-based compounds, titanium-based compounds, amide-based compounds, aluminum-based compounds, boric acid, borates, carbodiimide-based compounds, and oxazoline-based compounds.

Cationic resins other than the acrylic resin and polyvalent metal salts are preferably included as the ink fixing agents. Examples of the cationic resins include polyethyleneimine-based resins, polyamine-based resins, polyamide-based resins, polyamide-epichlorohydrin-based resins, polyamine-epichlorohydrin-based resins, polyamide-polyamine-epichlorohydrin based resins, polydiallylamine-based resins, and dicyandiamide condensation products. Examples of the polyvalent metal salts include calcium compounds, magnesium compounds, zirconium compounds, titanium compounds, and aluminum compounds. Of these compound, the calcium compounds are preferable and calcium nitrate tetrahydrate is more preferable.

The defoamers are not particularly limited. For example, mineral oil-based defoamers, polyether-based defoamers, and silicone-based defoamers are used and preferable defoamers are the mineral oil-based defoamers. Examples of hydrophobic silica-type mineral oil-based defoamers include, but are not limited to, Nopco 8034, Nopco 8034-L, SN Deformer AP, SN Deformer H-2, SN Deformer TP-33, SN Deformer VL, SN Deformer 113, SN Deformer 154, SN Deformer 154S, SN Deformer 313, SN Deformer 314, SN Deformer 316, SN Deformer 317, SN Deformer 318, SN Deformer 319, SN Deformer 321, SN Deformer 323, SN Deformer 364, SN Deformer 414, SN Deformer 456, SN Deformer 474, SN Deformer 476-L, SN Deformer 480, SN Deformer 777, SN Deformer 1341, and SN Deformer 1361 (manufactured by SAN NOPCO LIMITED), and BYK-1740 (manufactured by BYK-Chemie GmbH). Examples of metal soap-type mineral oil-based defoamers include, but are not limited to, Nopco DF-122, Nopco DF-122-NS, Nopco NDW, Nopco NXZ, SN Deformer 122-SV, SN Deformer 269, and SN Deformer 1010 (manufactured by SAN NOPCO LIMITED). Examples of amide wax-type mineral oil-based defoamers include, but are not limited to, Nopco 267-A, Nopco DF-124-L, SN Deformer TP-39, SN Deformer 477T, SN Deformer 477-NS, SN Deformer 479, SN Deformer 1044, SN Deformer 1320, SN Deformer 1340, SN Deformer 1360, and SN Deformer 5100 (manufactured by SAN NOPCO LIMITED). These defoamers may be used singly or in combination of two or more of these defoamers. The amount of used defoaming agent is not particularly limited and is desirably 0.01% by mass to 0.03% by mass relative to the entire coating liquid forming the coated layer.

In the coated layer according to the present invention, fine particles in addition to the above clay and heavy calcium carbonate having a predetermined particle diameter can be added as long as the fine particles do not impair the above excellent effects caused by using the combination of these clay and heavy calcium carbonate within a predetermined amount. Other fine particles such as zinc oxide, however, are desirably substantially excluded. In particular, for example, polymer fine particles such as (meth)acrylic ester resin particles represented by polymethyl methacrylate particles, zinc oxide particles having a volume average particle diameter of 0.05 μm or more and 2.00 μm or less, and other particles may substantially be excluded. Even when other particles are included, the amount is preferably less than 0.10% by mass in the coated layer. The coated layer substantially including only the clay and the heavy calcium carbonate having a predetermined particle diameter as fine particles (powder) and excluding particles other than unavoidable impurities allows the adhesion to the substrate and the printability to be particularly excellent.

For example, in the case where the aqueous acrylic polymer emulsion is used as the acrylic polymer serving as the matrix of the coated layer, the coating liquid for forming the coated layer can be prepared by adding the clay or the dispersion product thereof in water or the like, and the heavy calcium carbonate or the dispersion product thereof in water or the like into water serving as the dispersing medium of the aqueous acrylic polymer emulsion, and dispersing these materials using an appropriate stirring or dispersing machine such as a wet colloid mill, an edged turbine, and a paddle blade under rotation conditions of 500 rpm to 3,000 rpm usually for 1 minute to 5 minutes. Agglomeration may occur when the clay and the heavy calcium carbonate are fed directly into the aqueous acrylic polymer emulsion. Therefore, it is desired that the dispersion product of the clay and/or the calcium carbonate dispersed in a medium such as water be previously prepared with a dispersing agent being blended if necessary, and then these materials be blended into the aqueous acrylic polymer emulsion. The clay and the heavy calcium carbonate are almost equal in specific gravity, and thus each of the clay and the heavy calcium carbonate do not exist in an uneven distribution state in the dispersion product and thus both can be dispersed in a uniformly distributed manner.

<Method for Producing Printing Sheet>

As a method for producing the printing sheet according to the present invention, known methods for forming a coated layer on the surface of a substrate can be used. The methods can be performed by, for example, applying a coating liquid made of the aqueous acrylic polymer emulsion made by blending the clay in a ratio of 35% by mass or more and 65% by mass or less and the heavy calcium carbonate having a volume average particle diameter of 0.05 μm or more and 2.00 μm or less in a ratio of 5% by mass or more and 30% by mass or less in a dried mass to one surface or both surfaces of the substrate using an appropriate method such as roll coating, blade coating, bar coating, brush coating, spray coating, and dipping, and thereafter drying and curing the coated layer. The temperature conditions during drying or curing the coated layer are not particularly limited and the drying or curing may be performed, for example, at a temperature of 90° C. to 120° C.

In an aspect in which the sheet made of the above inorganic substance powder-blended thermoplastic plastic is used as the substrate, for example, the methods can be performed by molding a substrate including the polyolefin resin and the inorganic substance powder in a ratio of 50:50 to 10:90 in a mass ratio into a sheet by extrusion, after subjecting the sheet to a stretching treatment process, applying the coating liquid made of the aqueous acrylic polymer emulsion made by blending the clay in a ratio of 35% by mass or more and 65% by mass or less and the heavy calcium carbonate having a volume average particle diameter of 0.05 μm or more and 2.00 μm or less in a ratio of 5% by mass or more and 30% by mass or less in a dried mass to one surface or both surfaces of the substrate sheet using the appropriate method, and thereafter drying and curing the coated layer. As the mixing of the inorganic substance powder and the polyolefin resin in forming the sheet made of the inorganic substance powder-blended thermoplastic plastic, the polyolefin resin and the inorganic substance powder may be kneaded and melted before the materials are fed into the molding machine from the hopper, or kneading and melting of the polyolefin resin and the inorganic substance powder may be simultaneously performed with molding performed by the molding machine. The same is true for other additives other than the inorganic substance powder. In melting and kneading, the inorganic substance powder is preferably uniformly dispersed in the polyolefin resin and, at the same time, the mixture is preferably kneaded by applying high shear stress. For example, the mixture is preferably kneaded using a twin-screw kneader. When the inorganic substance powder is blended with the polyolefin resin, as the temperature becomes higher, an odor is more likely to be generated. Therefore, an aspect in which the treatment is performed at a temperature of the melting point of the polyolefin resin +55° C. or less, preferably a temperature equal to the melting point of the polyolefin resin or more and the melting point of the polyolefin resin +55° C. or less, and more preferably at a temperature of the melting point of the polyolefin resin +10° C. or more and at a temperature of the melting point of the thermoplastic resin +45° C. or less, is desirable.

A similar temperature is preferably used for the molding temperature when the inorganic substance powder-blended thermoplastic plastic is molded into a sheet by extrusion.

Furthermore, at the time of molding into a sheet, the stretching treatment is not particularly limited. The product can be stretched in a uniaxial direction, a biaxial direction, or a multiaxial direction (stretching by, for example, a tubular method) at the time of or after the molding. In the case of the biaxial stretching, the stretching may be either sequential biaxial stretching or simultaneous biaxial stretching.

Stretching (for example, longitudinal and/or transverse stretching) the sheet after molding allows the density of the sheet to decrease. This decrease in the density results in excellent whiteness of the sheet.

EXAMPLES

Hereinafter, the present invention will be described more specifically with reference to Examples. These Examples are described only for the purpose of exemplifying specific aspects and embodiments in order to facilitate the understanding of the concept and scope of the present invention disclosed in the present specification and described in the appended claims. The present invention, however, is not limited to these Examples.

(Evaluation Methods)

Each physical property values described in the following Examples and Comparative Examples were evaluated by the following methods.

(Adhesion)

In order to examine adhesion of a coated layer to a substrate, a peel-off test using cellophane adhesive tape was performed.

Tape for Measurement

Cellophane adhesive tape (width: 24 mm) in accordance with JIS Z1522:2009

Measurement Procedure-1

(1) Take out the tape having a length of about 75 mm.

(2) Stick the tape on a sheet to be measured and rub the tape with a finger so that the tape appears transparent. In this case, the tape is pressed with the flat part of the finger without pressing with a fingernail.

(3) Within 5 minutes after sticking the tape, lift up the edge of the tape so that the direction of peeling and the coated layer form an angle of approximately 60°, and surely peel the tape within 0.5 second to 1.0 second. The peeled surface was observed and whether the coated layer adhered to the substrate was visually observed. The adhesion between the coated layer and the substrate was evaluated in accordance with the following evaluation criteria.

Evaluation Criteria

○ No peeling of the coated layer occurs.

Δ The peeling of the coated layer is less than 20%.

x The peeling of the coated layer is 20% or more.

Measurement Procedure-2

With respect to the samples for which the above evaluation result was "o", the above procedures (1) to (3) were further repeated five times (numbers of times of sticking and peeling: in total, six times each), and the samples for which no peeling of the coated layer was observed were evaluated as "●".

(Surface Resistivity)

Surface resistivity was measured in accordance with JIS K 6911:2006. For the measurement, 100 mm square sheets were used as the samples and measurement was performed under the following conditions.

Temperature: 23° C. and humidity: 50$ (Whiteness)

At immediately after the production of the printing sheet, the state of the surface of the coated layer was visually observed and whiteness (b') was measured in comparison to an L*a*b* color space chromaticity diagram.

(LBP Printability)

In order to examine LBP printability of the printing sheet, color and monochrome test patterns were printed on each sheet using a laser printer (product name: Versant 80 Press, manufactured by Fuji Xerox Co., Ltd.), toner fixability was visually observed, and the printability was evaluated in accordance with the following evaluation criteria.

Evaluation Criteria

○ The test pattern is finely printed and no toner peeling occurs.

Δ Although the test pattern is printed well, slight toner peeling occurs.

x The test pattern is not printed well and significant toner peeling occurs.

(Offset Printability)

In order to examine offset printability of the printing sheet, a test pattern was printed on each sheet using an oil-based offset ink with an offset printer (product name: RMGT920, manufactured by RYOBI MHI Graphic Technology Ltd.), bleeding in printing and fixed misalignment were visually observed, and the offset printability (quick-drying of inks) was evaluated in accordance with the following evaluation criteria.

Evaluation Criteria

○ The test pattern is finely printed and no bleeding in printing and misalignment occur.

A Although the test pattern is printed well, slight bleeding in printing and misalignment occur.

x The test pattern is not printed well and significant bleeding in printing and misalignment occur.

(Water Resistance)

The surface of the coated layer was rubbed for 10 seconds with wet KimWipe (trade name, manufactured by NIPPON PAPER CRECIA CO., LTD.). Whether water marks remained or not was visually observed and the water resistance was evaluated in accordance with the following evaluation criteria.

Evaluation Criteria

○ No water marks remain on the surface of the coated layer.

Δ Slight stain-like water marks are generated on the surface of the coated layer.

x Significant stain-like water marks remain on the surface of the coated layer.

(Weather Resistance)

A metal halide weather test was conducted at a black panel temperature of 63° C. (±2° C.), a humidity of 50% (±5%), and an illuminance of 1,200 W/m$^2$ for 24 hours. States of the surface of the coated layer before and after the test were visually observed and color was measured in comparison to the L*a*b* color space chromaticity diagram and the weather resistance was evaluated in accordance with the following evaluation criteria.

Evaluation Criteria

○ Before and after the test, in the surface of the coated layer, almost no changes in brightness L* and chromaticity a*b* occur and yellowing does not substantially occur.

Δ Before and after the test, in the surface of the coated layer, slight changes in brightness L* and chromaticity a*b* occur while the value of the chromaticity b* increases, and yellowing slightly occurs.

x Before and after the test, in the surface of the coated layer, changes in brightness L* and chromaticity a*b* occur, in particular, the value of the chromaticity b* significantly increases, and yellowing occurs.

(Materials)

Components each used in Examples and Comparative Examples described later are as follows.

Substrate

S1:36.0 parts by mass of a polypropylene homopolymer (melting point: 160° C.), 60.0 parts by mass of heavy calcium carbonate powder, as an inorganic substance powder, having an average particle diameter of 2.2 μm (average particle diameter based on the air permeability method in accordance with JIS M-1511), and further 2.0 parts by mass of sodium alkanesulfonate (carbon number of alkyl group (average value)=12) as a lubricant were charged into an extruder equipped with a twin screw (T die-type extrusion molding apparatus, screw diameter of 20 mm, L/D=25). The mixture was kneaded at a temperature of 220° C. or less and the kneaded raw material was formed into a sheet with a T die at a molding temperature of 220° C. The extruded sheet was stretched while the sheet was wound using a winder to prepare, as a substrate, a sheet made of an inorganic substance powder-blended thermoplastic plastic. The thickness of the sheet thus obtained was 200 μm.

Aqueous Acrylic Polymer Emulsion

M1: An aqueous emulsion (solid content:water=50:50 (mass ratio)) of a (meth)acrylic acid alkyl ester copolymer made of n-butyl acrylate, methyl methacrylate, 2-ethylhexyl acrylate, methacrylic acid, vinyl acetate, and a rosin derivative contained in a mass ratio of 26:16:44:8:6:3

Ma: An aqueous emulsion (solid content:water=20:80 (mass ratio)) of a styrene-acrylic acid ester copolymer made of styrene, benzyl acrylate, butyl acrylate, 1,6-hexanediol dimethacrylate, and 2-hydroxyethyl methacrylate contained in a mass ratio of 84.0:26.0:32.0:0.1:0.9

Clay

C1: Kaolin clay (volume average particle diameter: 0.29 μm, specific gravity: 2.5)

C2: Kaolin clay (volume average particle diameter: 1.50 μm, specific gravity: 2.6)

Calcium Carbonate

H1: Heavy calcium carbonate (volume average particle diameter: 0.25 μm, specific gravity: 2.6)

H2: Heavy calcium carbonate (volume average particle diameter: 0.34 μm, specific gravity: 2.6)

H3: Heavy calcium carbonate (volume average particle diameter: 3.00 μm, specific gravity: 2.6)

L1: Light calcium carbonate (volume average particle diameter: 0.05 μm, specific gravity: 2.6)

L2: Light calcium carbonate (volume average particle diameter: 1.00 μm, specific gravity: 2.6)

Examples 1 to 6, Comparative Examples 1 and 8, and Reference Example 1

The aqueous acrylic polymer emulsion, the clay, and the calcium carbonate were blended to the type and amount as listed in Table 1 below and a coated layer coating liquid was prepared by stirring and mixing these components at 3,000 rpm for 3 minutes using an edged turbine. The amounts of added clay and calcium carbonate listed in Table 1 are values of the aqueous acrylic polymer emulsion in terms of dried mass. Water was used as a dispersing medium in any of the coated layer coating liquids and the solid concentration was determined to be 46% by mass. In any of the coating liquids, 0.1% by mass of a surfactant as a dispersing agent and 0.1% by mass of a hydrophobic silica-type mineral oil-based defoamer as a defoamer were blended. However, the surfactant and defoamer were not essential components and the coated layer coating liquid was able to be prepared without adding these components. The coated layer coating liquid prepared as described above was applied to the surface of the substrate using a micro-gravure method so as to achieve the predetermined film thicknesses listed in Table 1 and dried at 110° C. to prepare the printing sheet. For each obtained printing sheet, the adhesion, the surface resistivity, the whiteness, the LBP printability, the offset printability, the water resistance, and the weather resistance were measured under the conditions described above. The obtained results are listed in Table 2.

TABLE 1

[Composition of substrate and coated layer of each sample]

| | Substrate | Type of acrylic polymer[1)] | Amount of added acrylic polymer[2)] | Type of clay | Amount of added clay[2)] | Type of calcium carbonate | Amount of added calcium carbonate[2)] | Film thickness (μm) |
|---|---|---|---|---|---|---|---|---|
| Example 1 | S1 | M1 | 40 | C1 | 50 | H1 | 10 | 4 |
| Comparative Example 1 | S1 | M1 | 40 | C1 | 50 | L1 | 10 | 4 |
| Example 2 | S1 | M1 | 40 | C1 | 40 | H1 | 20 | 4 |
| Example 3 | S1 | M1 | 40 | C1 | 40 | H2 | 20 | 4 |
| Comparative Example 2 | S1 | M1 | 40 | C1 | 40 | H3 | 20 | 4 |
| Comparative Example 3 | S1 | M1 | 40 | C1 | 40 | L1 | 20 | 4 |
| Comparative Example 4 | S1 | M1 | 40 | C1 | 40 | L2 | 20 | 4 |
| Comparative Example 5 | S1 | Ma | 100 | — | 0 | — | 0 | 4 |
| Comparative Example 6 | S1 | M1 | 30 | C1 | 70 | — | 0 | 4 |
| Example 4 | S1 | M1 | 30 | C1 | 40 | H1 | 30 | 4 |
| Comparative Example 7 | S1 | M1 | 30 | C1 | 40 | L1 | 30 | 4 |
| Example 5 | S1 | M1 | 25 | C1 | 50 | H1 | 25 | 4 |
| Example 6 | S1 | M1 | 40 | C2 | 40 | H1 | 20 | 4 |
| Comparative Example 8 | S1 | M1 | 40 | C2 | 40 | L1 | 20 | 4 |
| Reference Example 1 | S1 | Ma | 40 | C1 | 40 | L1 | 20 | 4 |

[1)]Type of aqueous emulsion

[2)]Unit: % by mass

TABLE 2

[Evaluation result of each sample]

| | Adhesion | Surface resistively [Ω] | Whiteness (b*) | LBP printability | Offset printability | Water resistance | Weather resistance |
|---|---|---|---|---|---|---|---|
| Example 1 | ● | 1.00E+10 | 1.2 | ○ | ○ | ○ | ○ |
| Comparative Example 1 | ○ | 1.00E+10 | 1.0 | ○ | ○ | ○ | ○ |
| Example 2 | ● | 1.00E+10 | 1.0 | ○ | ○ | ○ | ○ |
| Example 3 | ● | 1.00E+10 | 1.2 | ○ | ○ | ○ | ○ |
| Comparative Example 2 | x | 1.00E+11 | 0.5 | x | x | ○ | ○ |
| Comparative Example 3 | ○ | 1.00E+11 | 0.9 | ○ | ○ | ○ | ○ |
| Comparative Example 4 | ○ | 1.00E+10 | 0.9 | ○ | ○ | ○ | ○ |
| Comparative Example 5 | x | 1.00E+12 | 0.6 | x | x | Δ | x |
| Comparative Example 6 | Δ | 1.00E+10 | 2.0 | ○ | Δ | x | Δ |
| Example 4 | ● | 1.00E+10 | 1.0 | ○ | ○ | ○ | ○ |
| Comparative Example 7 | ○ | 1.00E+12 | 0.9 | ○ | ○ | ○ | ○ |
| Example 5 | ● | 1.00E+10 | 1.1 | ○ | ○ | ○ | ○ |
| Example 6 | ● | 1.00E+10 | 1.0 | ○ | ○ | ○ | ○ |
| Comparative Example 8 | ○ | 1.00E+10 | 0.9 | ○ | ○ | ○ | ○ |
| Reference Example 1 | ○ | 1.00E+10 | 0.8 | ○ | ○ | ○ | Δ |

All of the printing sheets including predetermined amounts of clay and heavy calcium carbonate having a specific particle diameter in the coated layer according to the present invention exhibited excellent adhesion and bonding of the coated layer to the substrate and sufficiently excellent properties in terms of the whiteness, the LBP printability, the oil-based offset printability, the surface resistivity, the water resistance, and the weather resistance.

On the other hand, the printing sheets such as Comparative Examples 1, 3, and 4 including light calcium carbonate in the coated layer together with the clay had excellent properties such as printability, and the first evaluation result of the adhesion was also excellent. However, the evaluation results after multiple times of the application and peeling were inferior to those of the printing sheets in Examples according to the present invention. The printing sheet in Comparative Example 2, which included the heavy calcium carbonate H3 having a volume average particle diameter of 3.00 μm in the coated layer together with clay, did not have excellent printability and the adhesion of the coated layer was low. The importance of using the heavy calcium carbonate having a volume average particle diameter of 0.05 μm or more and 2.00 μm or less as the calcium carbonate powder was demonstrated.

In Comparative Example 5, which had a conventional constitution of an acrylic coated layer alone, adhesion was poor and problems arose in terms of the LBP printability, the offset printability, the surface resistivity, the water resistance, and the weather resistance, resulting in yellowing. Comparative Example 6, in which only clay was added and no heavy calcium carbonate was added, was inferior in terms of the offset printability, the water resistance, and the weather resistance to a certain extent.

As described above, according to the present invention, the printing sheet having the coated layer for ink receiving on at least one surface of the substrate, in which the printing sheet has excellent printability and excellent antistatic performance, being less likely to cause paper jams or other troubles during printing, and further has excellent properties such as water resistance and weather resistance, in particular, the printing sheet has remarkably excellent adhesion and bonding between the substrate and the coated layer, and the method for producing the same are provided.

The invention claimed is:

1. A printing sheet comprising:

a substrate; and a coated layer made by blending clay in a ratio of 35% by mass or more and 65% by mass or less and heavy calcium carbonate in a ratio of 5% by mass or more and 30% by mass or less in a continuous phase made of an acrylic polymer on one surface or both surfaces of the substrate with proviso that a coated layer in which zinc pyrithione is blended in a ratio of 0.40% by mass or more and 2.00% by mass or less and/or zinc oxide having a volume average particle diameter of 0.05 μm or more and 2.00 μm or less is blended in a ratio of 0.10% by mass or more and 1.00% by mass or less in the continuous phase when the entire mass of the coated layer is determined to be 100%, is excluded, wherein a volume average particle diameter of the heavy calcium carbonate is 0.05 μm or more and 2.00 μm or less, wherein the substrate is a substrate comprising a polyolefin-based resin and an inorganic substance powder in a ratio of 50:50 to 10:90 in a mass ratio.

2. The printing sheet according to claim 1, wherein the inorganic substance powder is a calcium carbonate powder.

3. The printing sheet according to claim 1, wherein a volume average particle diameter of the clay is 0.05 μm or more and 2.00 μm or less.

4. The printing sheet according to claim 1, wherein the acrylic polymer is a (meth)acrylic acid alkyl ester.

5. The printing sheet according to claim 4, wherein the (meth)acrylic acid alkyl ester is one or two or more compounds selected from the group consisting of methyl acrylate, ethyl acrylate, n-propyl acrylate, isopropyl acrylate, n-butyl acrylate, isobutyl acrylate, n-octyl acrylate, 2-ethylhexyl acrylate, isooctyl acrylate, nonyl acrylate, methyl methacrylate, ethyl methacrylate, n-propyl methacrylate, isopropyl methacrylate, n-butyl methacrylate, isobutyl methacrylate, n-octyl methacrylate, 2-ethylhexyl methacrylate, isooctyl methacrylate, 2-hydroxyethyl acrylate, 2-hydroxyethyl methacrylate, 2-hydroxypropyl acrylate, and 2-hydroxypropyl methacrylate.

6. A method for producing a printing sheet, the method comprising a step of applying an aqueous acrylic polymer emulsion made by blending clay in a ratio of 35% by mass or more and 65% by mass or less and heavy calcium carbonate having a volume average particle diameter of 0.05 μm or more and 2.00 μm or less in a ratio of 5% by mass or more and 30% by mass or less in a dry mass in a continuous phase made of an acrylic polymer to one surface or both surfaces of a substrate with proviso that an aqueous acrylic polymer emulsion in which zinc pyrithione is blended in a ratio of 0.40% by mass or more and 2.00% by mass or less and/or zinc oxide having a volume average particle diameter of 0.05 μm or more and 2.00 μm or less is blended in a ratio of 0.10% by mass or more and 1.00% by mass or less in the continuous phase when the entire dry mass of the aqueous acrylic polymer emulsion is determined to be 100%, is excluded, wherein a substrate comprising a polyolefin resin and an inorganic substance powder in a ratio of 50:50 to 10:90 in a mass ratio is molded into a sheet by extrusion; and after subjecting the sheet to a stretching treatment step, the aqueous acrylic polymer emulsion is applied to one surface or both surfaces of the substrate sheet.

* * * * *